United States Patent Office 3,609,819
Patented Oct. 5, 1971

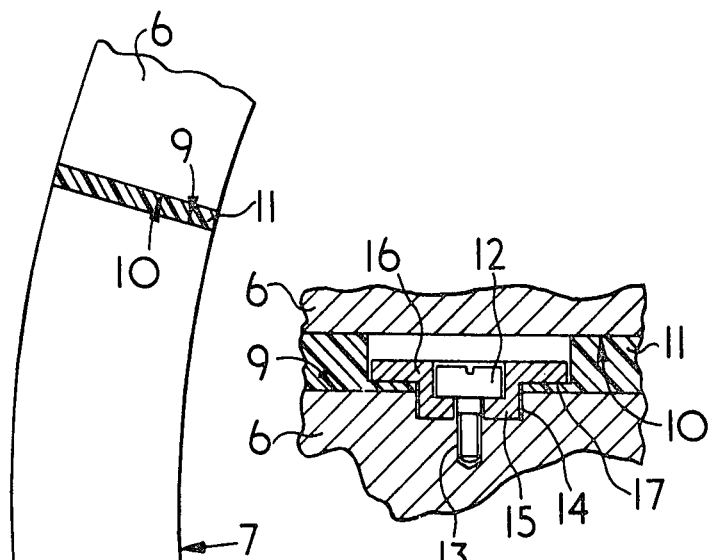
FIG. 3
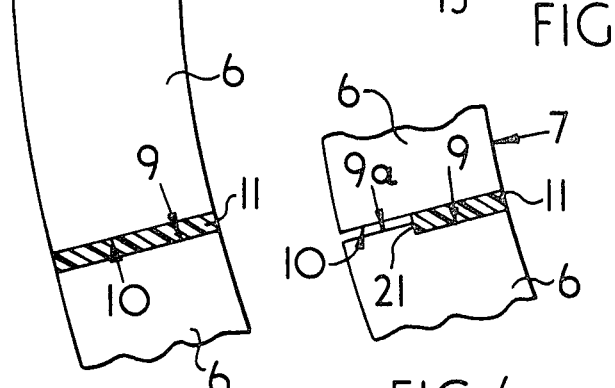
FIG. 2
FIG. 6
INVENTOR
ERIC H. SEARLE
By Stevens, Davis, Miller & Mosher
ATTORNEYS

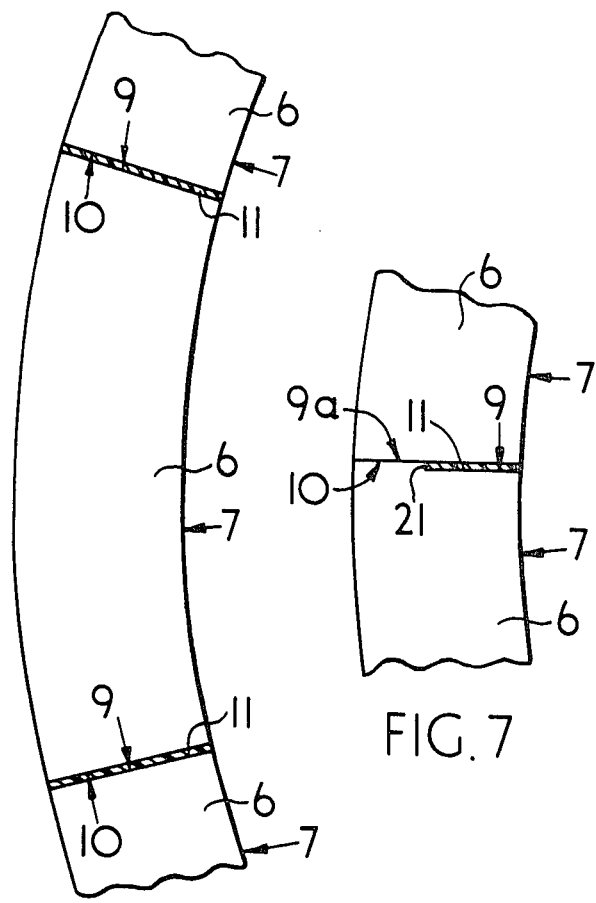

3,609,819
MOULDING APPARATUS
Eric H. Searle, Sutton Coldfield, England, assignor to
The Dunlop Company Limited, London, England
Filed Nov. 4, 1968, Ser. No. 772,929
Claims priority, application Great Britain, Nov. 8, 1967,
52,548/67
Int. Cl. B29c 1/00
U.S. Cl. 18—42 T                                    9 Claims

ABSTRACT OF THE DISCLOSURE

A multi-piece mould e.g. a segmented tire mould, having a plurality of mating surfaces for sealed engagement one with another when the mould is assembled, some at least of said surfaces being relatively disposed at different angular relationships to one another and at least one of said surfaces being formed of a material of relatively greater compressibility, and, perhaps additionally, of relatively smaller co-efficient of friction, than the material of the other mating surfaces.

---

This invention relates to moulding apparatus.

In the construction of multi-piece moulds having a plurality of mating surfaces in which the mating surfaces are disposed at different angular relationship one with another, when the mould pieces are assembled together, difficulty is found in arranging for all of the mating surfaces to fit tightly together when the mould is closed so as to form a complete seal to prevent formation of moulding flash on the moulded article. Very accurate machining of the mating surfaces may result in substantially a complete seal being achieved but this is difficult, expensive and time consuming.

It is an object of the present invention to provide a multi-piece mould having a plurality of mating surfaces which will close together in substantially complete sealing relationship without the need for the very high standard of machining accuracy which has been required hitherto.

According to the invention there is provided a multi-piece mould having a plurality of mating surfaces for sealed engagement in the assembled condition of the mould, at least some of said surfaces being relatively disposed at different angular relationships one to another and at least part of at least one of the said surfaces being formed from a material of substantially greater compressibility than the material of one at least of the other mating surfaces whereby when the mould is closed under load the material of substantially greater compressibility is compressed to effect said sealed engagement.

Preferably the material of the said surface or surfaces of greater compressibility also has a smaller coefficient of friction than the material of said one other mating surface. For example it may be of "Fluorosint," polytetrafluoroethylene (P.T.F.E.) and mica, a material made by Polypenco Limited, Gatehouse, Welwyn Garden City, England, the material of the remaining surfaces being steel.

The invention also includes an article e.g. a pneumatic tire, moulded in a multi-piece mould as described in the two preceding paragraphs.

Figure 4:
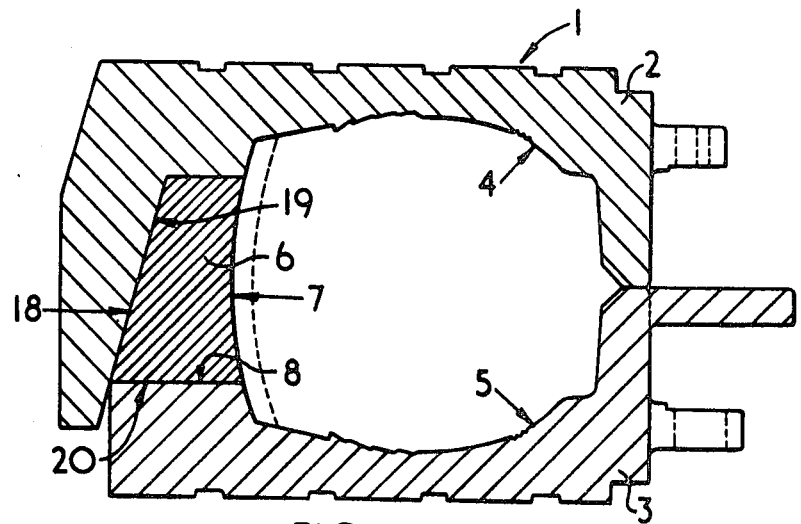
Figure 1:
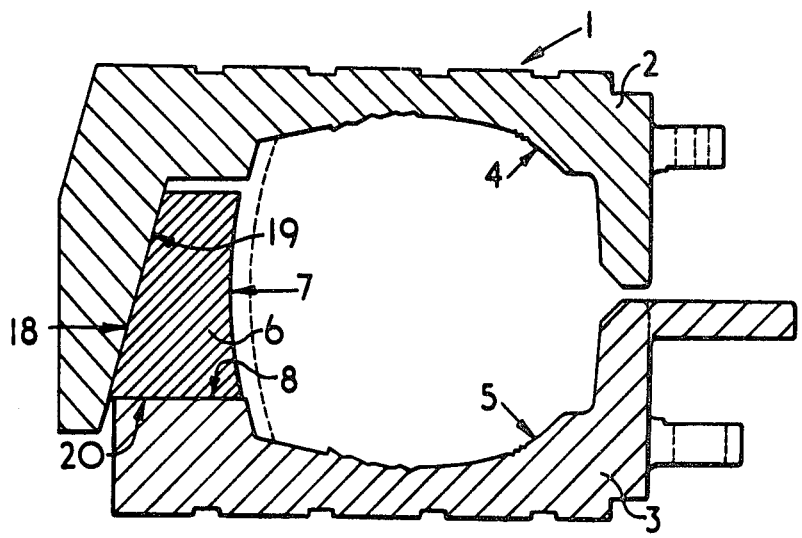

One embodiment of the invention, a segmented mould for moulding pneumatic tires, will now be described by way of example with reference to the accompanying drawings of which:

Fig. 1 shows a diagrammatic cross-sectional view through part of a segmented tire mould before complete closure thereof, FIG. 2 shows part of a diagrammatic plan view of the mould as shown in FIG. 1, FIG. 3 shows in detail the method of attachment of a "Fluorosint" layer to a segment surface, FIG. 4 shows a diagrammatic axial cross-sectional view of the mould shown in FIG. 1 after complete closure thereof, FIG. 5 shows part of a diagrammatic plan view of the mould as shown in FIG. 4, FIG. 6 shows part of a diagrammatic plan view of an alternative mould construction to that shown in FIG. 2, FIG. 7 shows part of a diagrammatic plan view of the mould construction shown in FIG. 6, after complete closure thereof.

It should be noted that in all these drawings certain parts of the mould have been omitted for the sake of clarity.

The mould 1 is provided with two opposed mould halves 2 and 3 mounted in co-axial relationship, each having a sidewall- and bead-moulding portion 4 and 5. A plurality of tread moulding segments 6 each having a moulding face portion 7 of aluminium and the remainder of steel are located between the mould halves in the form of an annulus, the segments being slidable radially inwardly and outwardly with respect to the axis of the annular tire mould, into and out of mutual engagement, the sliding action of the lower surface 20 of each segment 6 taking place on an upper surface 8 on the lower mould half 3.

Each of the segments has two end faces 9 and 10, each face extending in a substantially radial plane of the mould 1. One end face 9 of these two is substantially completely covered by a ¼" thick layer 11 of "Fluorosint" which is attached to the face by screws 12 (see FIG. 3). Since each screw head is of the order of ¼" thick the threaded hole 13 for receiving the screw is positioned at the base of a recess 14 in the end face 9 into which the screw head and part of a dished washer 15 fit. This washer is provided with a radially extending flange 16 which engages with a flange 17 formed in a recessed hole 18 provided in the "Fluorosint" layer. The dished washer flange 16 is relatively larger and thereby spreads the load exerted when the layer is screwed into position, thus avoiding damage to the relatively expensive layer 11. A "Fluorosint" layer is provided on the same relative end face 9 of each segment so that each uncovered face 10 opposes a covered face 9.

The compression modulus of the "Fluorosint" material is 150,000 pounds per square inch while that of the material of the tread segments 6 which are made of steel, is 30,000,000 pounds per square inch, i.e. the strain, for a given load, in the "Fluorosint" material is 200 times that of the steel.

When the mould parts are first closed together as shown in FIGS. 1, 2 and 3 the substantially greater strain for a given load experienced by the "Fluorosint" layer causes greater compression of this layer than that of the other surfaces in engagement in the closed state of the mould. An initial seal is thus achieved between the "Fluorosint" layer 11 and its opposed surface 10. By applying downwards pressure to the upper mould half 2 which engages with the segments 6 by means of corresponding axially tapering surfaces 18 and 19 formed on the segment and mould half respectively, the mould is completely closed (see FIGS. 4 and 5), further compression of the layer occurring and thus allowing the remaining surfaces of the moulds to move together to form a complete seal. Substantially no mould flash will thus be formed on the moulded tire.

An alternative construction of the embodiment is illustrated in FIGS. 6 and 7. In this instance the "Flourosint" layer 11 does not extend over the whole of one end face 9 of each segment 6 but only from the moulding surface 7 of the segment into abutting relationship with a step 21 formed in the face 9. The portion 9a of the end face 9 radially outwards of the step 21 is closer to the uncovered end face 10 of the adjacent segment than that portion radially inwards thereof in the initial sealing condition of the mould as shown in FIG. 6 and comes into contact with the uncovered end face 10, when the mould is completely closed (see FIG. 7). The pressure exerted on the end faces of the segments in this completely closed position is thus taken mainly by the steel faces 9a and 10, the "Fluorosint" layer 11 being at least partially protected by this arrangement.

In both embodiment constructions just described the "Fluorosint" layer extends from immediately adjacent the moulding surface of the segment to substantially prevent the formation of any moulding flash.

A further advantage of these constructions is that, on account of the lower co-efficient of friction of the "Fluorosint" material when sliding on a steel surface, opening and closing of the mould is facilitated when compared with the opening and closing of moulds having steel-upon-steel sliding surfaces.

Other faces of the segments e.g. the lower face 20 thereof may also be covered in a "Fluorosint" layer the opposing steel surface 8 of the lower mould half 3 being left uncovered. Alternatively only the radially inner part of each of said other surfaces may be covered, the arrangement being similar to that as described in the aforementioned alternative construction.

The invention can be applied to a mould incorporating spring members of the kind described in the present assignee's Patent 3,553,789 of Jan. 12, 1971, the spring members providing the necessary force to cause sliding action of the "Fluorosint" facings over the contacting steel surfaces.

Having now described my invention, what I claim is:

1. A multi-piece pneumatic tire mould having a plurality of tread moulding segments with a tread moulding surface and a plurality of radially-extending surfaces being formed on each segment, a plurality of pairs of mating surfaces for sealed engagement in the closed condition of the mould, at least some of said pairs of surfaces being relatively disposed at different angular relationships one to another and at least part of at least one surface in each of said pairs of surfaces which are so disposed being formed from a material of substantially greater compressibility than the material of the other surface in each of the pairs of mating surfaces whereby when the mould is closed under load the material of substantially greater compressibility is preferentially compressed to effect said sealed engagement.

2. A multi-piece mould according to claim 1 wherein the material of substantially greater compressibility has a substantially smaller co-efficient of friction than that of the material of the other surface in each of the pairs of surfaces which are relatively disposed in different angular relationships.

3. A multi-piece mould having a plurality of pairs of mating surfaces for sealed engagement in the closed condition of the mould, at least some of said pairs of surfaces being relatively disposed at different angular relationships one to another and at least part of at least one surface in each of said pairs of surfaces which are so disposed being formed of polytetrafluoroethylene and mica which is of substantially greater compressibility than the material of the other surface in each of the pairs of mating surfaces whereby when the mould is closed under load the polytetrafluoroethylene and mica is preferentially compressed to effect said sealed engagement.

4. A multi-piece mould according to claim 1 wherein the material of said other surfaces which are relatively disposed in different angular relationships comprises steel.

5. A multi-piece mould according to claim 1 wherein at least one radially-extending surface of at least one segment is formed from said material of substantially greater compressibility.

6. A multi-piece mould according to claim 1 wherein at least a radially-inner part of at least one first radially-extending surface of the segment which comes into contact with a similar surface of an adjacent segment on closure of the mould is formed from said material of substantially greater compressibility, the said radially-inner part extending from the tread moulding surface of the segment.

7. A multi-piece mould according to claim 1 comprising two sidewall- and bead-moulding members between which the segments are located on closure of the mould, each segment having two second radially-extending surfaces one of which comes into contact with one member and the other into contact with the other member on said closure, at least a radially inner part of at least one of said second radially-extending surfaces being formed from said material of substantially greater compressibility, the said radially-inner part extending from the said tread moulding surface of the segment.

8. A multi-piece annular mould having a plurality radially movable segments and pairs of mating surfaces on the contacting faces of adjacent pieces for sealed engagement in the closed condition of the mould, at least some of said pairs of surfaces being relatively disposed at different angular relationships one to another and at least part of at least one surface in each of said pairs of surfaces which are so disposed being formed from a material of substantially greater compressibility than the material of the other surface in each of the pairs of mating surfaces whereby when the mould is closed under load the material of substantially greater compressibility is preferentially compressed to effect said sealed engagement.

9. The mould of claim 5 in which the material of substantially greater compressibility is Fluorosint.

References Cited

UNITED STATES PATENTS

| 2,734,227 | 2/1956 | Costick et al. | 18—39 |
| 3,082,480 | 3/1963 | Balle | 18—42 |
| 3,273,205 | 9/1966 | Hanley | 18—42 |

WILLIAM S. LAWSON, Primary Examiner

U.S. Cl. X.R.

18—Dig. 55